United States Patent [19]
DeAngelis et al.

[11] Patent Number: 5,657,077
[45] Date of Patent: Aug. 12, 1997

[54] EVENT RECORDING SYSTEM WITH DIGITAL LINE CAMERA

[76] Inventors: Douglas J. DeAngelis, 59 Elm St., Woburn, Mass. 01801; Kirk Sigel, 69 Elm St., #3, Cambridge, Mass. 02139; Mike Ciholas, 303 Lowell St., #5, Somerville, Mass. 02143

[21] Appl. No.: 19,222

[22] Filed: Feb. 18, 1993

[51] Int. Cl.⁶ .............................. H04N 5/30; H04N 7/12
[52] U.S. Cl. .............................. 348/157; 348/222; 368/9
[58] Field of Search ...................................... 348/148, 157, 348/222, 399; 345/196; 368/9, 10, 113; 346/107 B; H04N 3/14, 5/30, 7/12

[56] References Cited

U.S. PATENT DOCUMENTS

| | | |
|---|---|---|
| 3,829,869 | 8/1974 | Balko et al. |
| 4,156,870 | 5/1979 | Desarzens. |
| 4,702,585 | 10/1987 | Harada et al. |
| 4,743,971 | 5/1988 | Hugli. |
| 4,754,342 | 6/1988 | Duffy. |
| 4,797,751 | 1/1989 | Yamagnchi. |
| 4,920,429 | 4/1990 | Jaffe et al. |
| 5,103,433 | 4/1992 | Imof .......................................... 368/9 |
| 5,105,395 | 4/1992 | Imhof ........................................ 368/9 |
| 5,136,283 | 8/1992 | Nobs. |

OTHER PUBLICATIONS

Brochure—"Macfinish" by Intersoft Electronics (7 Pages).
Brochure—"Macfinish, a Product of Intersoft Electronics" by Intersoft Electronics of Belgium (16 Pages).
Brochure—"Time Tag Identification System" America Sports Timing Systems, Inc. (4 Pages).
Publication—"Accutrack" by Speciality Instruments Corporation (pp. 1–24).
Brochure—"Omega Electronics Introduces Video Photofinish Systems" by Kiefer Sports Timing Systems, Jan. 1, 1991, (18 Pages).
Brochure—"Photosprint OPS 2" by Omega Electronics (2 Pages).
Publication—"Key Innovations" by Seiko (pp. 9–10 with 3 attached pages).
Publication—"2048 × 2048 Pixel 12–Bit Digital CCD Camera" by Photometrics (1 Page).

Primary Examiner—Glenton B. Burgess

[57] ABSTRACT

A system for recording and displaying a time-sequential scene on a computer comprising a digital camera, an image timer, and a main control computer. The digital camera transmits a sequence of digital image frames to the timer representative of the image of a body passing a plane in space. Each frame represents a line of the body, thus forming a fractional part of the scene. Once the frame reaches the image timer, it is digitally marked with a time reference and buffered into a block of information. The main control computer stores blocks of information from the image timer for a variety of processing and features available to the user. A compression system compresses a sequence of digital image frames for storage into a selected memory, preferably a virtual memory subsystem, or hard-disc drive.

43 Claims, 8 Drawing Sheets

EVENT RECORDING SYSTEM WITH DIGITAL LINE CAMERA

BACKGROUND OF THE INVENTION

This invention is directed generally to systems which monitor and record motion events. More particularly, it relates to the accurate management and control of time-sequential imaging and display, with application in numerous fields of science and technology. Most particularly, the invention provides a total race-management system which has wide ranging utility in measuring timed sporting events.

Prior art systems which track and record a motion event over time are overwhelmingly directed towards the support of racing events. Standard photographic techniques which monitor the finish line of a race are known. Typically, cameras equipped for high resolution imaging view the finish line and sequentially capture pictures at a high rate for later use by an interpreter. However, this process is cumbersome, wasteful, and time-consuming, requiring, for example, an apparatus of photographic film and paper, processing chemicals, and image enlargers or projection optics. Consequently, most races rely on human judges and revert to "photo-finish" technology only in extremely close races. Specialty Instrument Corporation provides a myriad of such electronic and photo-finish systems under the trademark Accutrack™. U.S. Pat. No. 3,829,869 exemplifies one such Accutrack™ system.

Because of the problems with the "photo-finish" technology, numerous other systems for monitoring racing events have been developed. However, these other methods and systems for timing sporting events present new difficulties. Video systems which record and display races in a standard television or video format are popular, but regardless of the particular implementation of these systems, a portion of the electronic image remains on an analog medium, e.g., video tape. Since analog data from the systems consists of a continuum of information over time, it is relatively difficult to accurately apportion to a unique time interval. It is even more difficult to access a particular moment in time in the recorded sequence because the associated system must search the storage medium, typically having a long physical length in a spooled format, e.g., a video cassette. This presents both limitations and difficulties for users wishing to simultaneously record, view the current race, and review earlier segments of the race (or even a previous race) because only one user can have access to any of the information stored and recorded at any one time.

A further difficulty in analog data is that it must be converted to a signal usable for video, television, or a computer before it is displayed. For example, after a completed search, the selected video tape segment is typically sent to active memory before it can be processed by a computer and, quite possibly, by supplemental complex graphics generators. Altogether, the analog format and related processing adds to the time required to review a race and therefore lengthens the decision making process.

Another problem faced by race systems occurs in the management of extended time events, like a marathon or bicycle race, which can last for hours or until each entrant finishes. The runners or cyclists cross the finish line in groups; and for long periods, the finish line is void of persons. The relevant information at the finish line is thus sporadic, and includes significant amounts of "dead" time. In analog systems, this dead time is nevertheless recorded and stored so that the system can retain time synchronism with the event, even though it is generally useless for other reasons and adds to the time required for processing and reviewing the race.

Several race systems have attempted to improve the management and accessibility of data taken during a race by transforming the recorded information to a digital equivalent. But, these systems also revert to an analog format before displaying the race on a screen. As examples, U.S. Pat. No. 4,797,751 shows a video recording system having both digital and analog sections to provide display on a common cathode ray tube (CRT). U.S. Pat. No. 5,136,283 similarly describes another partially digital system which displays races on a standard television format. These analog/digital systems still have many of the problems inherent in all analog systems.

It is, accordingly, an object of the invention to provide a system for recording and displaying a time-sequential scene of bodies crossing a plane. In particular, the system provides improvements in managing and recording timed sporting events which reference bodies or entrants crossing a finish line relative to the start of an external event.

Still another object of the invention is to provide improvements in the manipulation of timed information representative of bodies passing a plane in space, such as person crossing a finish line in a race.

Yet another object is to provide improved access, control and storage of a scene comprising a sequence of discrete time images.

Most particularly, it is an object of the invention to provide a race monitoring and recording system which can record and display a race in a digital format.

These and other objects will become apparent in the description below.

SUMMARY OF THE INVENTION

The invention features, in one aspect, a system for recording and displaying a time sequential scene of bodies moving across a plane in space. The system includes at least one digital camera which views and images a line object in the plane of interest. The camera time-sequentially captures the line object by imaging it onto an array of detector elements and converts the sampled signal into a digital image, or frame, of the line object. Each digital image frame uniquely represents a slice of the moving scene at a moment in time. The system also includes an image timer, with a timer processor, that responds to a preselected digital value from the camera and marks each frame with a digital time reference using a preselected number of bytes within the frame information. The image timer may also store the digital frames from the camera in an internal buffer. The system further includes a main control computer having an internal memory, a user console, and a graphics display monitor. The computer stores the frames from the image timer buffer as blocks of information in its internal memory, via an associated software pointer, and selectively displays a portion of the stored frames as a time-sequential scene on the monitor. A user at the computer console can command a variety of functions provided by the invention to manipulate and analyze the captured scene, most particularly to display any portion of the scene of bodies moving across the plane and access an associated time for any frame within.

The system thus summarized is particularly useful in recording and managing the official times of objects or entrants crossing a finish line, and at a rate which is over fifty times faster (and more accurate) than a related video race management system. A user can record and display the bodies crossing the plane of interest, i.e., the finish line, with accuracy while maintaining the ability to review and edit in real-time the stored images. Accordingly, it is useful that the time references associated with each frame are triggered with a start sensor and correlated to the start of an external event, e.g., a gun start signal. The invention thus provides, in another aspect, a timer clock that is synchronized to the start of an event and which provides the timer processor with an accurate reference to mark the respective moments in time for each frame.

In other aspects, the digital camera can include a line scan charge coupled device which forms the array of detector elements. The camera can also include a greyscale gain controller to adjust the digital output signal according to a preselected gain level, preferably selectable at the main control computer, and, preferably, to a gain level corresponding to the digital values in the captured frames. The gain controller can function in a real-time fashion by adjusting the greyscale gain applied to each frame as captured by the camera during operation of the invention. The camera is completely computer controlled from a remote location. This computer control, which is achieved by passing signals along the coaxial cable, allows remote control of focus, zoom, pan and all other camera functions.

In still other aspects, the resolution of the scene as captured by the camera, or as displayed on the screen, is selectable by a user. With respect to the camera, the resolution in the time-domain, i.e., in the direction of motion, is adjustable by selecting the frame rate at which the camera captures the digital image frames. The resolution in the spatial-domain, i.e., along the line object length, is adjustable by changing the camera density control which activates only particular detector elements in the array.

With respect to the resolution as displayed on the monitor, the user can, in another aspect, zoom a particular scene in or out on the screen. For example, by zooming the scene out, the whole race can be viewed at once; and by zooming in, particular areas of the scene are enlarged on the screen, suitable, for example, to interpret the number identifier of a particular runner. The zoom capability is available to users at the main control computer in either screen dimension, i.e., in the time and spatial directions, concurrently or independently.

A user of the system thus described has a variety of controls at the main control computer. Any frame of a displayed scene can be removed, either temporarily or permanently, according to other aspects of the invention by "cropping" the frames. A list of "cropped" frames is placed into a listing memory. A time-crop control allows a user to cut-out, or "crop", uninteresting portions of the scene—for example periods of time containing no activity or bodies crossing the plane—while retaining an absolute time reference for the remaining frames, which collectively display a continuous scene. The time-crop control further can restore the cropped frames, by deleting them from the listing memory, or permanently erasing them.

In another aspect, a user can also selectively reverse the time-sequential order of the displayed scene so that the scene as displayed appears as though the motion of bodies passing the plane in space occurred in the other direction. In addition, a user can point to particular bodies on the display to provide both an object identifier, if selected, and a unique time identification representative of the point selected.

The system constructed in accordance with the invention also provides, in another aspect, a virtual memory subsystem, like a hard-disc drive. The main control computer stores blocks of information into the virtual memory subsystem to free space in its own internal memory and to provide a storage medium for previous scenes, for example previous races. Storage into the virtual memory subsystem is initiated by an optional command or can occur automatically when a predetermined selectable fraction of the internal memory is utilized. The storage arrangement on the virtual memory subsystem is, in another aspect, ordered so that the main control computer can access and selectively retrieve a block of information from the virtual memory subsystem for storage in its internal memory by computing an offset from the initial memory location where the blocks of data are stored. In this manner, the internal memory of the main control computer can function as a cache for the virtual memory subsystem, thereby storing only a few active blocks in volatile RAM.

To aid the storage capability of the virtual memory subsystem, the invention accordingly provides a compression system to compress the blocks of information into less memory space. The compression system is selectively controlled, both in initiating the compression of certain data and in regulating the accuracy of the compressed information.

The compression system takes advantage of the fact that each digital image frame comprises a column of n-bit numbers, and a sequence of digital frames thus forms an array of rows of n-bit numbers. In a preferred aspect, the compression occurs by first converting the array of digital image frames to an array of rows of m-bit greyscale numbers (where the integer m is less than the integer n). The converted array of rows of m-bit digital image frames is then reformatted in a row-by-row fashion by collecting adjacent and equal m-bit numbers into a group and representing the collection as a "count" and a greyscale "value". These rows are reformatted again into a sequential memory string thereby compressing the data to a smaller amount. Preferably, the "count" is either a byte or a 3-bit number, and the m-bit "value" is formed by a 5-bit representation of each of the original n-bit numbers, although the accuracy of the compression is selectable by a user by changing the number m. If the count is a 3-bit number, the count and value form one byte. For example, a 4-bit number can be used to compress the data further.

In yet another aspect, the invention can include a plurality of digital cameras, each with an associated buffer within the image timer, to independently capture a sequence of digital image frames. Thus multiple scenes are generated, preferably of a view containing substantially the same line object, for display on the computer. At least two scenes can be shown simultaneously on a single monitor from two separate cameras in both a real-time display or from previously recorded segments. In another aspect, one or more additional computers are installed in communication with the virtual memory subsystem to access and separately display and manipulate data captured by any one of the connected cameras. Thus, a second user can analyze previously recorded motion segments while a first user concentrates on a current motion event.

The digital camera and image timer each have associated processing CPUs which can selectively compress data before transmission along a signal line. For example, the digital camera can reduce the bandwidth requirements of the signal line or cabling between it and the image timer by commanding a first compression on the digital data transmitted from the camera. The image timer can reduce the bandwidth requirements of the cabling or signal line between it and the main control computer by commanding a second compression on the data transmitted between the two using a similar compression scheme.

In a preferred aspect, a single cabling is used between the image timer and camera. This cable preferably is in the form of a single coaxial cable that functions as a signal line to command various functions at the camera, a data transfer line to transmit digital information to the image timer, and a power line to supply power to the camera. Similarly, the cabling between the image timer and main control computer or any additional computers can have like capability.

In still another aspect, the main control computer allows a user to access an object identifier and an associated time corresponding to the object, e.g., for use in a race-management system. For example, prior to the start of a race, the lanes within the camera FOV can be spatially referenced to a portion of the displayed image such that when a user points to that portion, both the lane number and any associated object, e.g., a race entrant, is available on the display monitor. Further, according to an additional aspect, the time and name of a particular object is automatically entered within a results window on the display monitor once a user so commands it.

These and other aspects will become apparent in the following description, where the invention is described and illustrated in connection with certain preferred embodiments; however, it should be clear that various additions, subtractions, and modifications can be made by those skilled in the art without departing from the scope of the invention.

BRIEF DESCRIPTION OF THE DRAWINGS

A more complete understanding of the invention may be obtained by reference to the drawings in which.

DETAILED DESCRIPTION OF THE INVENTION

Figure 1:
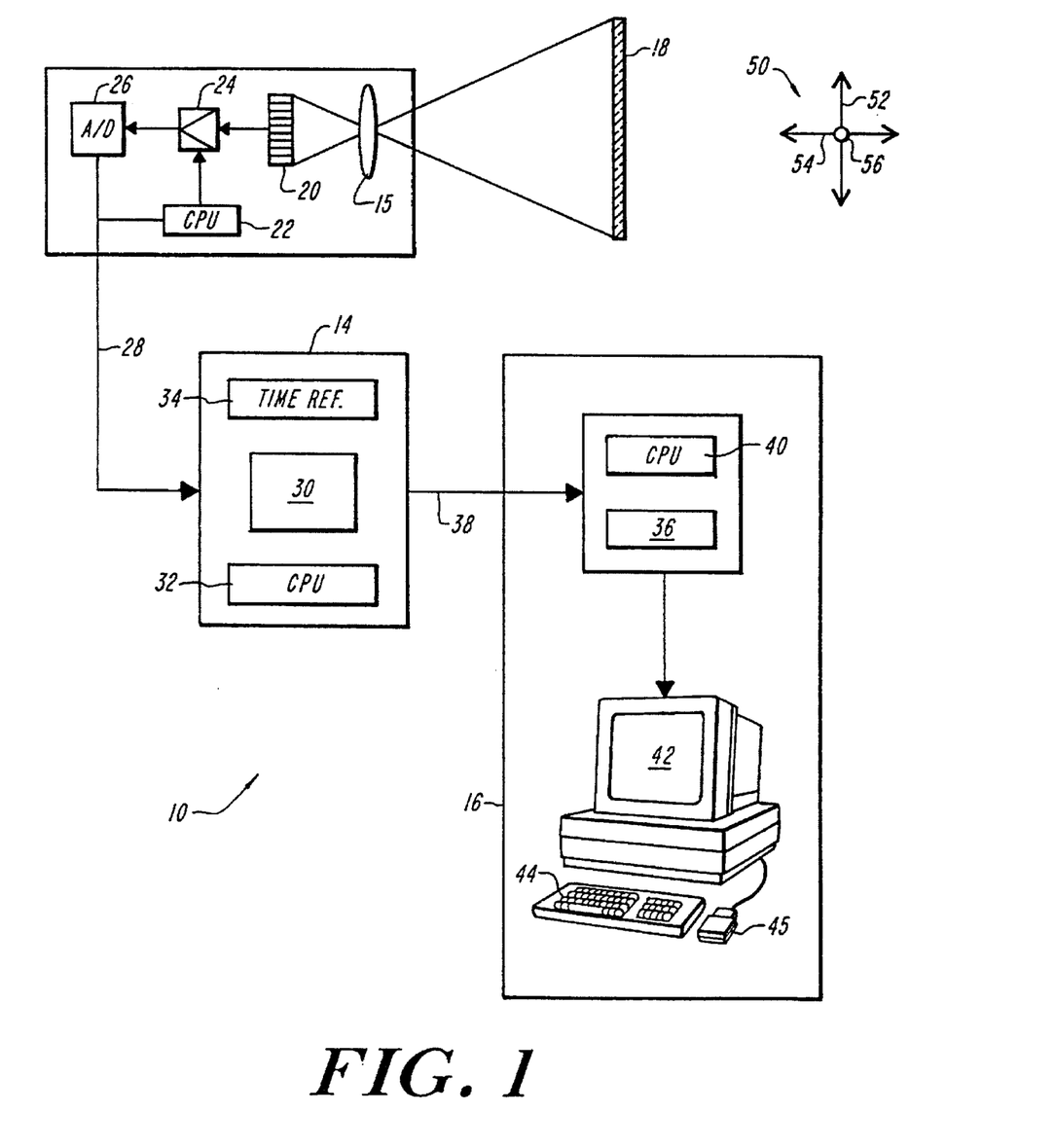
FIG. 1 schematically illustrates a system constructed in accordance with the invention for recording and displaying a time-sequential scene of bodies crossing a plane.

FIG. 1 illustrates a system 10 constructed in accordance with the invention for recording and displaying a sequence of bodies crossing a plane in space. The system includes a digital camera 12, an image timer 14, and a main control computer 16. With internal optics 15, the camera 12 views and images the line object 18 onto an array of detector elements 20, preferably a Line Scan Charge Coupled Device (LS-CCD). A camera processor 22 time-sequentially samples the image at the detector elements 20 and amplifies and digitizes the output signal at the gain controller 24 and A/D converter 26, respectively. Each sampled image represents a frame of digital information at a unique moment in time.

Each digital image frame is transmitted along a signal line 28, preferably a coaxial cable, to the buffer memory 30 of the image timer 14. The timer processor 32 marks each frame as it enters the image timer 14 with a time reference, preferably generated by the timer clock 34, by storing the time reference within the digital information of the frame. Thus each digital image frame stored in the buffer contains both the stored digital representation of the line object 18 and a unique time associated with it. In a preferred embodiment, the time reference for each frame is indicative of the time the camera 12 captured the picture relative to the start of an external event.

The buffer 30 stores the frames generated from the camera 12 until they accumulate to a preselected memory allocation, called a "block", after which the main control computer 16 transfers the block to its own internal memory 36 via a signal line 38.

The main control computer 16 has a central processor 40 that processes the blocks of information stored within the internal memory 36 so that the scene and time contents of a sequence of digital image frames are displayed on the display monitor 42. The central processor 40 also controls the automatic operation and memory management of the system 10, and responds to inputs at the keyboard 44 and mouse 45 so that a user can selectively command the display of any scene captured by the system 10, including a real-time display or previously recorded segments. More particularly, a user can access the unique times associated with any portion of the scene.

In a preferred embodiment, commands to the digital camera 12 from the timer 14 and the main control computer 16 are transmitted within the signal line 28, which is a single coaxial cable. The coaxial cable 28 additionally acts as a power control line to supply energy to the camera 12 so that the camera 12 can operate without a remote power source.

With further reference and description of FIG. 1, a three-dimensional orientation chart 50 is provided to facilitate a better understanding of the operation of the invention. The system 10 operates by sequentially capturing the image of the line object 18 as viewed by the camera 12 at discrete moments in time. The line object 18 is typically only a fraction of a "scene" as observed by a person at the display monitor 42. That is, each line object 18 captured by the camera 12 sequentially forms part of a larger picture, or "scene", of the bodies moving by the field of view (FOV) of the camera 12. This FOV is essentially a plane in space, representable by the axes 52 and 54 of the chart 50, because the detector array 20, and its conjugate line object 18, are practically one dimensional: the line object 18 has its long dimension along the axis 52 of the chart 50 and its short dimension (not shown) along the axis 56 perpendicular to the page of FIG. 1. The camera 12 focuses on the line object 18 at a distance directed along the axis 56 from the camera to the object 18.

Figure 2:
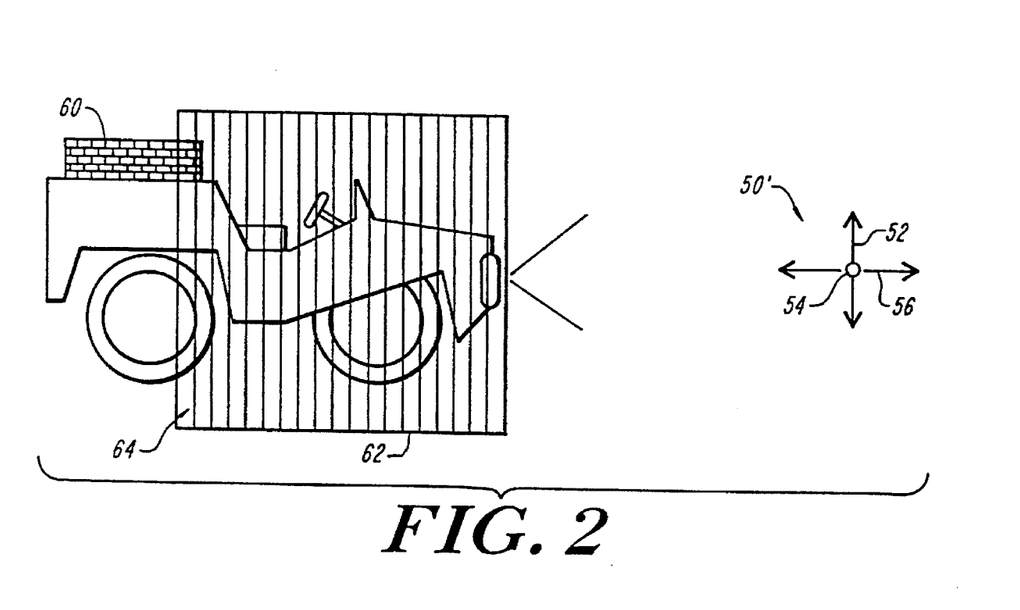
FIG. 2 illustrates how a system constructed according to the invention sequentially constructs a scene from discreetly sampled line objects.

Thus for example, FIG. 2 illustrates an object 60 which is in motion along the axis 56 of chart 50', a 90° rotation of chart 50. The camera (not shown) is focused on the object 60 with a FOV substantially in the plane of axes 52 and 54. As each frame is captured, a portion of the object 60, i.e., a line object, is uniquely and spatially represented as a digital image frame. In FIG. 2, the successive line objects captured by the system are illustratively shown on the object 60 as successive rectangles 62. For each of the line-objects 62, the digital camera 12 correspondingly generates a frame by sampling the image of the line object according to the number of detector elements within the array 20. That is, each of the line objects 62 is digitally segmented along its length (i.e., along the axis 52) into a digital image frame according to the sampling at the detector array 20 and transmitted at a moment in time to the image timer 14. In a real-time aspect, line object 64 represents the most recently captured frame and the remainder of the object 60 to the left of line object 64 has yet to be captured by the system. A scene or composite image of an object displayed on the computer 16 can look very much like the actual object passing by the FOV of the camera 12.

As mentioned earlier, each digital image frame captured by the system 10 of FIG. 1 is marked with a particular time reference from the camera and stored into blocks of information at the computer 16. The camera sends a special digital value to the timer which the timer recognizes as a start/end of a frame. The timer then marks the received frame with the associated time reference.

Figure 3:
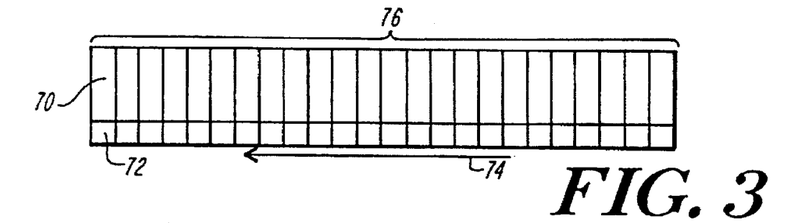
FIG. 3 illustrates a collection of digital image frames forming a block of information, where each frame is marked with an associated time reference.

FIG. 3 illustrates more fully these operations. Each digital image frame 70 captured by the system 10 includes an array of digital bytes corresponding to the signal detected by the activated elements of the array 20. When a frame enters the image timer 14, the timer processor stores the time associated with that frame in the last four bytes 72, thereby permanently associating each frame with a unique time. In FIG. 3, time is shown increasing with the arrow 74; thus frames towards the left of FIG. 3 are later in time than those on the right.

FIG. 3 also illustrates the collection of frames which form a block of information 76 utilized by the main control computer 16. According to a preferred embodiment, frames are organized into blocks of information that are 16 k-bytes in size. The number of frames which make up the block 76 therefore depends upon the amount of information within each frame—which is a variable dependent upon the further features of the invention discussed below.

Figure 3A:
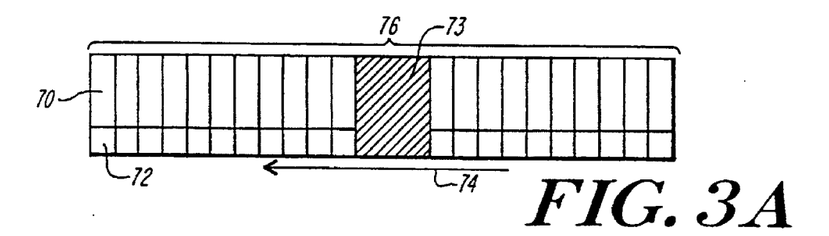
FIG. 3A illustrates a preferred embodiment of the invention in which particular frames are cropped from a sequence of frames.

FIG. 3A illustrates a particular feature of the invention which is enabled because of the unique time reference associated with each frame of FIG. 3. In particular, according to a preferred embodiment, a user at the display monitor 42 of FIG. 1 can select and crop selected frames 73 from the scene displayed without disrupting any of the information available in any other frames. A cropped portion 73 can be within a block 76, as illustrated in FIG. 3A, or some portion thereof (not shown). The address of the cropped frames are initially sent to a listing memory (a memory associated listing table) which holds their addresses until they are either erased permanently (which can occur by a "save" operation) or re-inserted within the cropped sequence. This is particularly useful in a scene or race which has uninteresting segments that simply waste valuable memory. It also helps in the interpretation of a displayed scene because both the overall length of the scene as viewed from the monitor is decreased and the depth aspect of the displayed scene is improved. If, for instance, a first runner was several seconds ahead of a second runner, the recorded sequence between the runners can be cropped and the display on the screen appears as though no significant time between the runners exists. Of course, the time relationship of the runners remains accurate and when a user accesses the times associated with the runners, the time-discontinuity between the two will become apparent.

Figure 4:
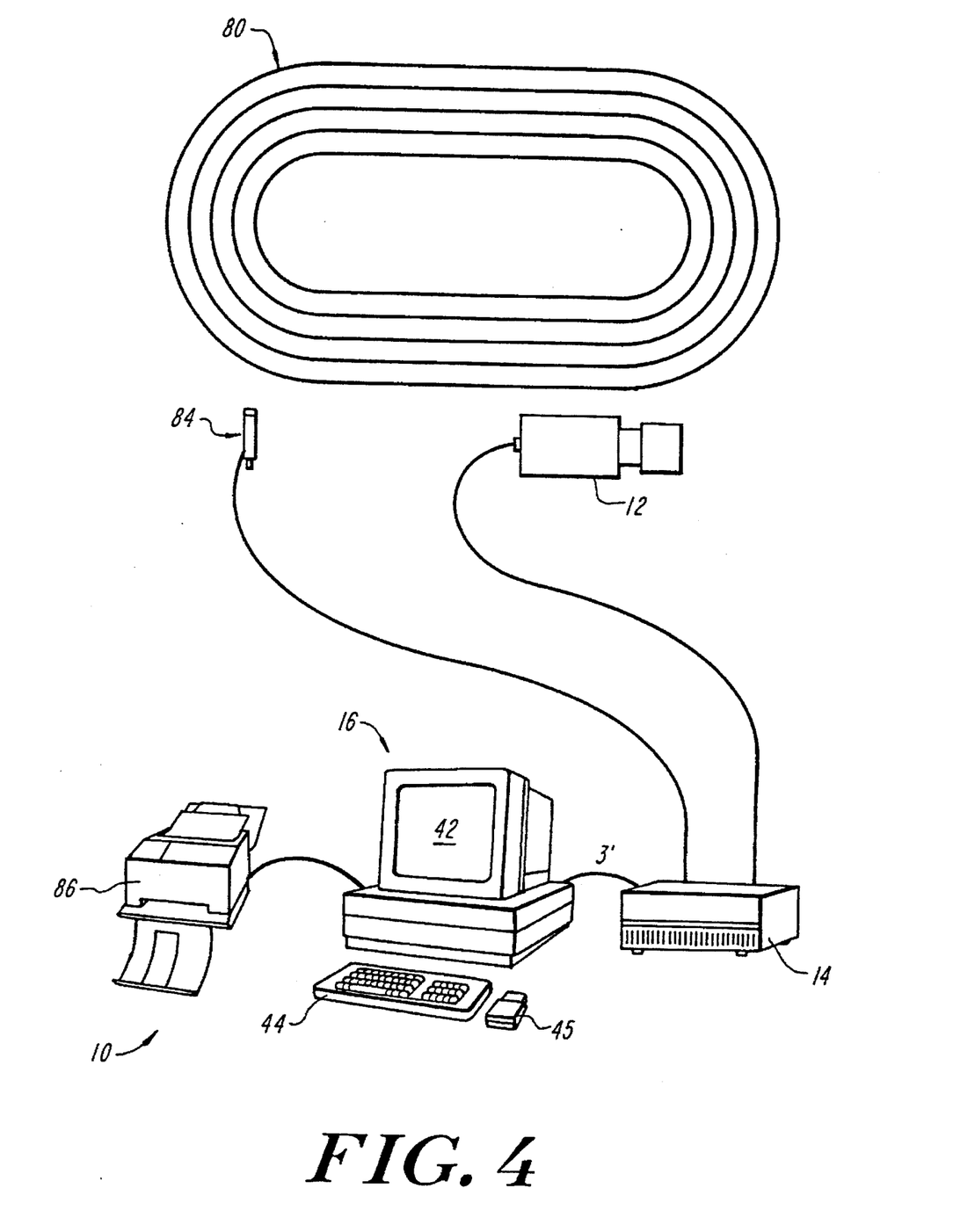
FIG. 4 illustrates a preferred use of the invention in which a system constructed in accordance with the invention operates as a race-management system which views and records a race.

As discussed earlier, the most obvious use for a system constructed in accordance with the invention is directed towards race management. FIG. 4 illustrates a system 10 in a configuration suitable to capture the motion of bodies crossing the finish line of a race. The system 10 is illustratively shown next to the race course 80 with the digital camera 12 located to view the plane representative of the finish line. The image timer 14 receives digital image frames from the camera 12 at a frame rate selectable within the system 10 and marks each frame with its associated time reference. The main control computer 16 retrieves and stores the frames from the image timer 14 as blocks of information and displays the recorded scene on the display monitor 42. The computer 16 also allows a user, in the illustrated embodiment, to control certain features of the invention described below by the keyboard 44 and a computer mouse 45.

Also shown in FIG. 4 is a start sensor 84 which responds to the start of an external event, for example the start gun which signals that the race has begun, and which signals this time to the image timer 14. The timer clock 34 of FIG. 1 is calibrated to this start signal and the timer processor 32 marks each of the frames entering the timer 14 with a time reference that is relative to the detected start time.

A printer 86 can be installed with the system 10 to print selected scenes and information about the event recorded.

Figure 5:
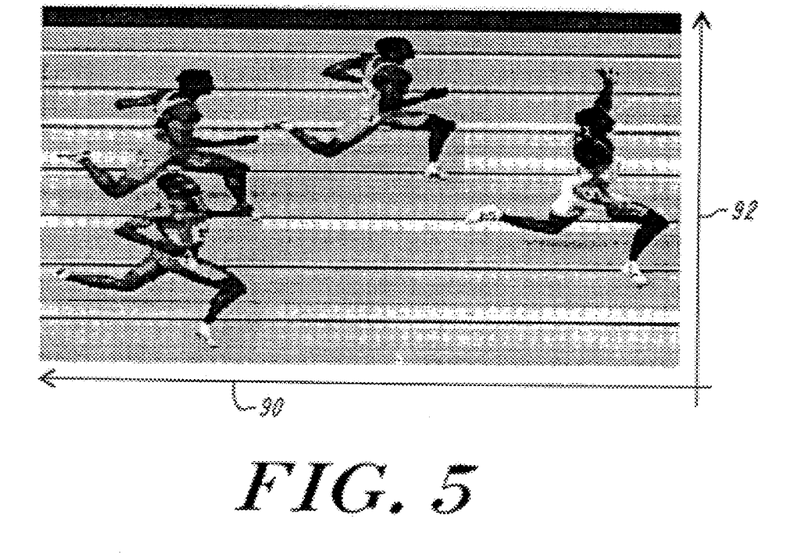
FIG. 5 illustrates a typical display of a racing scene generated by a system constructed in accordance with the invention.

FIG. 5 illustrates a scene generated by the system 10 of a race containing four participants, exemplifying a typical display available on the monitor 42 (FIGS. 1 and 4) and printer 86 (FIG. 4). In FIG. 5, the arrow 90 is in the time dimension and points to increasing time; while the arrow 92 refers to the spatial dimension corresponding to the spatial information within the digital image frames. This image can be zoomed in or out on the monitor 42 (described in more detail below) by a user operating the computer 16. In the preferred embodiment, a user of the system 10 can select the resolution or image quality of a scene generated by the system 10 by adjusting any of three separate parameters. First, by adjusting the frame rate, i.e., the rate at which the camera captures each line object in the scene, the amount of resolution information available along the axis 90 changes. Secondly, by adjusting the camera density, i.e., by selectively activating or deactivating certain elements along the detector array 20, the resolution information available along the axis 92 changes. Third, by zooming in and out on the display monitor, the amount of displayed resolution changes in either or both of the axes 90 and 92. In general, the best display detail or resolution occurs when the user displays every frame recorded by the system 10 at a high frame rate and every pixel is activated on the detector array 20.

However, other considerations must be made when adjusting these three parameters. First, it may seem intuitive that the highest frame rate available by the system is preferable in all instances. But if the frame rate is too fast, the objects can appear "fat" on the monitor 42, unless zoomed out. For example, if the race consists of runners traveling at about 20 mph, approximately 500 frames per second makes the participants appear normal on the display 42 without zooming. If the entrants were instead tortoises, a much slower frame rate would be preferable (if they are slower by 1/100, for example, a frame rate of 5 Hz would be ideal). Another factor influenced by the frame rate is the energy available to the detectors within the camera. If the frame rate is too fast, the image could appear dim because the detectors did not have sufficient time to integrate the available light energy from the line object. This depends, of course, on the sensitivity of the detectors and the spectrum utilized by the camera. In the preferred embodiment, the detector array 20 of FIG. 1 responds to visible light energy, and therefore requires more time to capture a particular image at dusk or twilight hours. If, on the other hand, the array 20 was constructed to respond to infrared energy, for example with HgCdTe material, the frame rate would be adjusted according to the temperature and speed of the objects.

The invention thus provides an automatic gain control (AGC) mechanism to actively compensate for differing levels of light energy from the scene of interest. The camera processor 22 and gain controller 24 of FIG. 1 programmably adjust the gain applied to the digital image frames transmitted from the camera to the image timer in real-time. The camera processor 22 responds to a command from the main control computer to raise or lower the gain in conjunction with the gain controller 24 by quantifying the digital values within the digital image frames output from the A/D converter 26 and modifying the sensitivity of the camera.

For example, if the average digital value in a series of image frames is too low, the scene at the computer would appear dim. A command by the user at the main control computer to increase the gain appropriately improves the displayed screen contrast. A user can also select how fast the AGC control of the camera operates by adjusting the bandwidth of the gain control. A user effectively changes the AGC bandwidth by selecting the amount of time the camera 12 takes to quantify the average digital value used in setting the active gain. Although not generally practical for the majority of motion events, like races, the gain could theoretically vary for every frame generated by the camera by increasing the AGC bandwidth to a maximum setting.

As previously mentioned, the resolution is modified in the spatial dimension 92 of FIG. 5 by changing the camera density which selectively activates certain detector elements on the detector array 20. Thus by decreasing the camera density by a two or four-factor, the resulting spatial resolution will similarly decrease by one-half or one-fourth, respectively. As more detectors are deactivated by decreasing the camera density, the amount of detail recorded along the axis 92 of FIG. 5 decreases. This can be a desirable feature if high detail is not required for a particular scene since it significantly reduces the amount of information stored by the system 10.

More particularly, the camera density is adjustable in a programmable fashion by a user at the computer 16 of FIG. 1, which transmits a signal to the camera processor 22. The processor 22 thereafter selects only the appropriate data to send to the image timer 14, corresponding to the commanded camera density that activates the particular detector elements within the array 20.

With respect to displayed resolution, a user most readily adjusts the displayed image quality by zoom operations. Because each frame stored by the system contains a unique time reference, the process of zooming is easily attained by skipping or duplicating frames in the scene without compromising the critical time relationships within the scene. The mouse 45 of FIG. 1 and 4 allows the user to point to particular objects on the scene and zoom either in or out by clicking the mouse, to thereby see more or less detail of the image, respectively. It is particularly useful when used in conjunction with the time-crop control discussed earlier whereby a user can zoom out and crop several sequences of "dead" time within a long race to shorten the stored file length. The zoom operation is available along both directions of the displayed scene; that is, a zoom within the spatial and time dimensions may be made either concurrently or independently. Multiple zooms are centered on the display according to the selected point of interest. However, the information available during zoom operations is constrained to the amount of information captured according to the frame rate and density settings of the digital camera; it does not generate new information. If the display resolution exceeds the available captured resolution, the displayed image can be smoothed by an appropriate interpolation scheme.

The amount of information captured by the system 10 is itself an important quantity. The LS-CCD detector element array 20 of FIG. 1 is preferably 1024 elements long, which is commercially available. Once the detector array is sampled and digitized, each detector element activated has 8-bits, or a "byte", of information associated with the particular frame. In this configuration, each frame has 1024 bytes of information at the highest camera density. In a preferred embodiment, a block of information contains 16k-bytes of memory, and therefore sixteen frames form a block of information if every detector on the LS-CCD array is activated.

However, if a user decreases the camera density by activating every other pixel along the array 20, the data amount within one frame is reduced by one-half, i.e., to 512-bytes and the number of frames within a block of information increases to 32. This is an important feature because most computers are limited by processing speed and memory. If a long event is permanently recorded, at some point the amount of memory is exceeded. A virtual memory subsystem, or hard-disc drive, as described below in a preferred embodiment of the invention greatly adds to the amount of memory available for the system. Nevertheless, by reducing the camera density and frame rate, as well as the judicious cropping and data compression such as described below, the amount of digital information representing each frame and the rate at which data is transferred between the camera and the image timer can be greatly reduced.

The data rate processed by the system 10 typically does not exceed 10 Mbits/s (e.g., corresponding to 1000 frames per second and 1024 active detector elements with 8-bits per element). Thus the system 10 is generally not subject to noise problems, time delays and processing constraints so that the distance between the camera 12 and timer 14 of FIGS. 1 and 4 can be at least one thousand feet in length.

Figure 6:
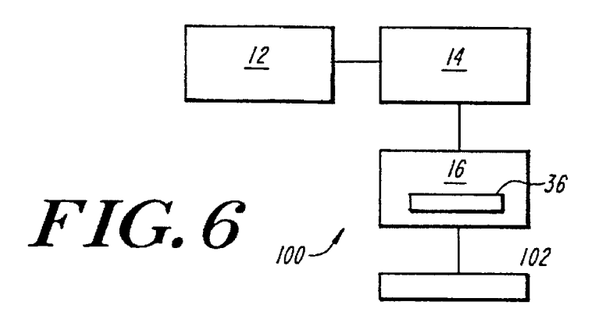
FIG. 6 illustrates a system constructed in accordance with the invention having a virtual memory subsystem.

Nevertheless, the amount of information stored and recorded can be large for a given event or series of events. At 10 Mbits/s, for example, every second of an event requires approximately one Mbyte of storage. In a preferred embodiment of the system 10, a virtual memory subsystem is included to accommodate the storage of data. FIG. 6 illustrates a system 100 constructed in accordance with the teachings herein which includes a virtual memory subsystem, or hard-disc drive 102.

The system 100 stores blocks of information into the virtual memory subsystem 102 when the blocks stored within the internal memory 36 for the main control computer 16 exceed a predetermined memory threshold. A user can select the threshold or rely on a default setting, e.g., 2-Mbytes of internal memory which can hold at least 125 blocks of information. Functionally, the main control computer accesses each block in internal memory by an associated software pointer which has a zero value when the block is transferred to the virtual memory subsystem.

Accordingly, the virtual memory subsystem can operate as an integral component of the system 100, and essentially transparent to a user. When a block of information is needed for processing by the main control computer 16, the block is transferred to internal memory 36 and an unneeded block transferred to the virtual memory subsystem 102. In this fashion, the system 100 can hold a scene of information which greatly exceeds the amount of RAM in the internal memory 36. In practical terms, the main internal memory 36 operates as a cache for the hard disc virtual memory 102.

The semantics for accessing frames from any associated storage memory is straightforward. Since a determinable number of frames comprise each of the blocks of information, the frame number divided by the number of frames per block gives the correct block address, and the remainder gives the correct frame address within the selected block. If cropping is involved, memory is simply re-ordered into new blocks of frames, with a corresponding reallocation of frame addresses.

Even with a very large memory capacity within the subsystem 102, it too can be exceeded when several motion events in a row are processed and stored, or long events are timed. The invention thus provides a compression system for reducing the amount of information needed in the blocks of information. The compression system is preferably available for use by a system constructed in accordance with the invention utilizing the virtual memory subsystem 102, which conveniently operates as a depository for the compressed data. The data compression can be automatic or selectively chosen by a user, for example after recording a particular motion event.

The compression system relies on the fact that each frame within the scene has the same background information within it. That is, if there is no motion activity within the FOV of the camera, each frame has practically the same information within it since the system constantly captures a single stationary line object; it is the motion of bodies crossing the FOV plane which generate a scene of interest. Thus, many frames stored for a given scene or motion event have redundant information.

More particularly, the camera 12 of FIG. 1 generates an 8-bit greyscale number, i.e., a number between a dynamic range having up to 256 shades of grey, for every active detector element in every frame. This corresponds to the amount of light energy within the image of the line object captured at that detector for a given frame. When a sequence of frames contains redundant information, the 8-bit numbers between successive frames are approximately equal.

In a preferred embodiment, the first step taken by the compression system is to convert every 8-bit number in a selected sequence of digital image frames into a 5-bit number in the range 0–31. Thus, an 8-bit number between the values 248–255 would be transformed to a 31; and a 8-bit number between 240–247 would be transformed to a 30; and so on. This compression process sacrifices the number of greyscales available within a picture (i.e. how "bright" a particular point on an object is represented by 32 numbers instead of 256 numbers) but saves a large amount of memory. It is worth noting that this is not a significant loss as some common VGA monitors have only 16 shades of grey available.

Figure 7:
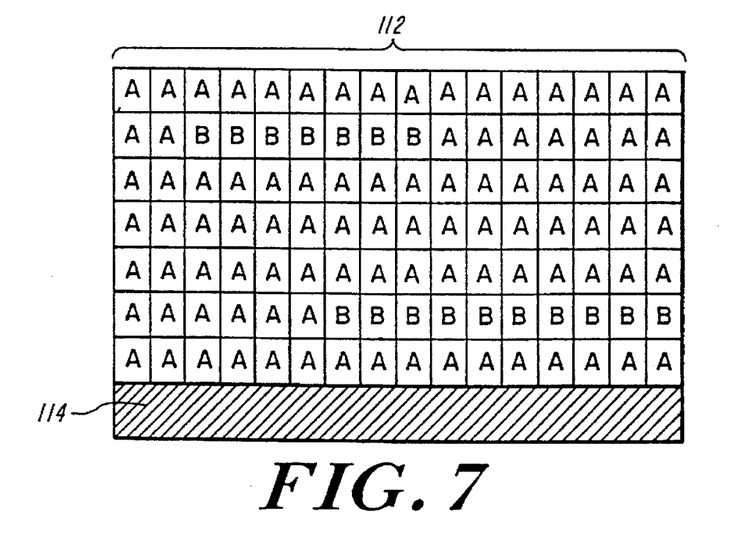
FIG. 7 shows a sequence of data corresponding to an illustrative first step in a compression of the sequence of digital image frames as provided by the invention.

FIG. 7 illustratively shows a sequence of frames 112 containing seven 5-bit numbers with a possible digital value of "A" or "B", and an associated time reference 114 in the last four bytes of the frame (in reality, there are 32 different values possible in this sequence, but "A" and "B" are used for ease of demonstration). Thus FIG. 7 illustrates a sequence of frames after the initial transformation by the compression system from 8-bit numbers to 5-bit numbers. In FIG. 7 (including FIGS. 7A and 7B), each square represents a byte. As you can see, the redundant 5-bit numbers are very apparent and unnecessarily waste memory space.

Figure 7A:
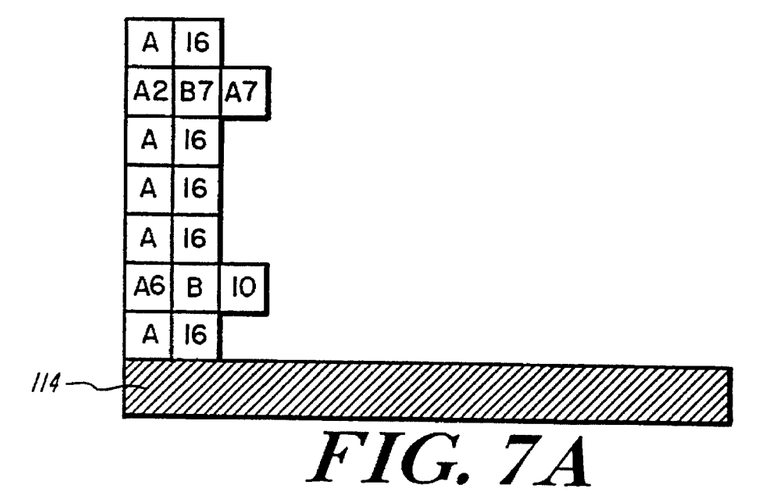
FIG. 7A shows a second illustrative step in the compression of the data sequence shown in FIG. 7.

FIG. 7A shows the next step of the compression system where each row of 5-bit numbers is reformatted by accumulating numbers of equal value within a row and then representing these accumulations as a "count" and a "value". The count corresponds to the number of equivalent 5-bit numbers in a series, and the "value" corresponds to the actual 5-bit digital number. Thus, for example, the first row of sixteen 5-bit numbers "A" can be represented by a count "16" and a value "A". The second row has a count "2" having the value "A", followed by a count "7" having the value "B", and followed by a count "7" having a value of "A". This process continues until the information within every row of 5-bit numbers contains a progression of "counts" and "values", as FIG. 7A illustrates. It is worth noting that if the "count" is less than or equal to "7", it is representable by a 3-bit number (the number "8" is reserved for an indication that the count will be represented by a separate byte). Thus in the second row of FIG. 7A, each of the "counts" plus "values" can occupy the space of one 8-bit number. But if the count exceeds 7, the "count" and "value" numbers are each represented by a separate byte.

Figure 7B:
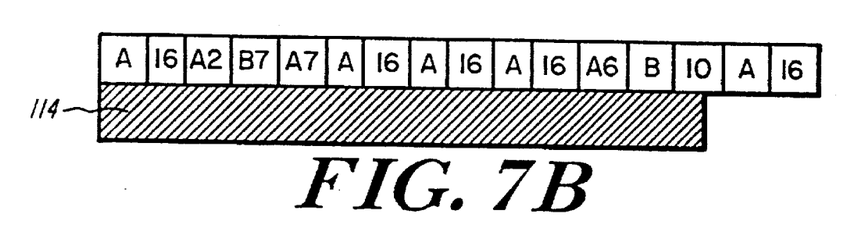
FIG. 7B shows a third illustrative step in the compression of the data sequence shown in FIG. 7A.

The last step of the compression system is shown in FIG. 7B. The significantly trimmed rows of FIG. 7A are appended to each other to form the final and compressed representation of the original sequence of digital image frames, which now occupies a significantly smaller amount of memory. The time reference information 114 is kept unchanged, however. Note that provided m is less than n in this compression scheme, the file cannot exceed its original memory size.

Figure 8:
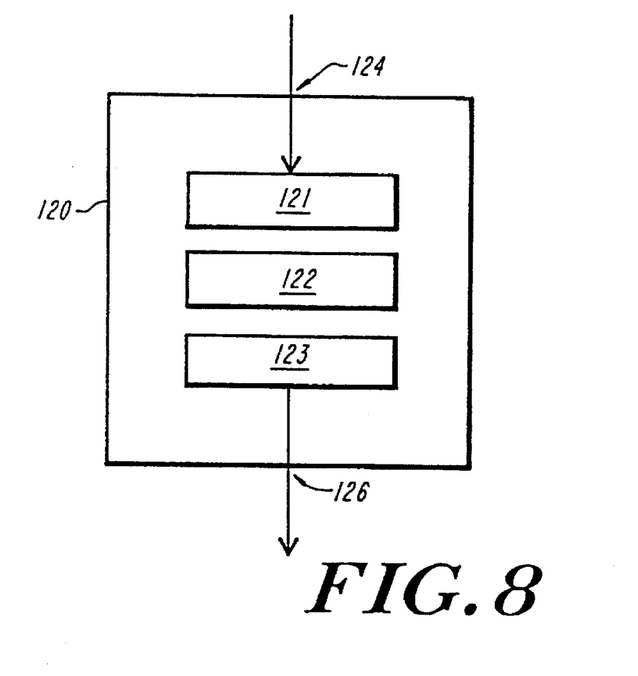
FIG. 8 schematically shows a compression system constructed in accordance with the invention.

FIG. 8 illustrates a compression system 120 constructed in accordance with the invention. In particular, FIG. 8 shows three process actuators 121, 122, and 123 which perform the steps of the operations described in FIG. 7, 7A, and 7B. A sequence of digital image frames enters the system 120 at a first data port 124. Process actuator 121 converts each n-bit number within the sequence as a representative m-bit number, to form, for example, an array such as shown in FIG. 7. Process actuator 122 reformats the array of rows of m-bit numbers into representative "counts" and "values" as for instance shown in FIG. 7A. Process actuator 123 again reformats the data to a sequential listing with the time reference information appended, such as shown in FIG. 7B. Data thus compressed exits the compression system from a second data port 126 for transmission to a storage memory, e.g., the virtual memory subsystem.

When a frame is required for processing by the main control computer, the compressed information is similarly uncompressed into a block of information before it is processed for display and manipulation by a user of the system. Upon uncompression, however, only 32 greyscale numbers are available, not the original 256.

Figure 9:
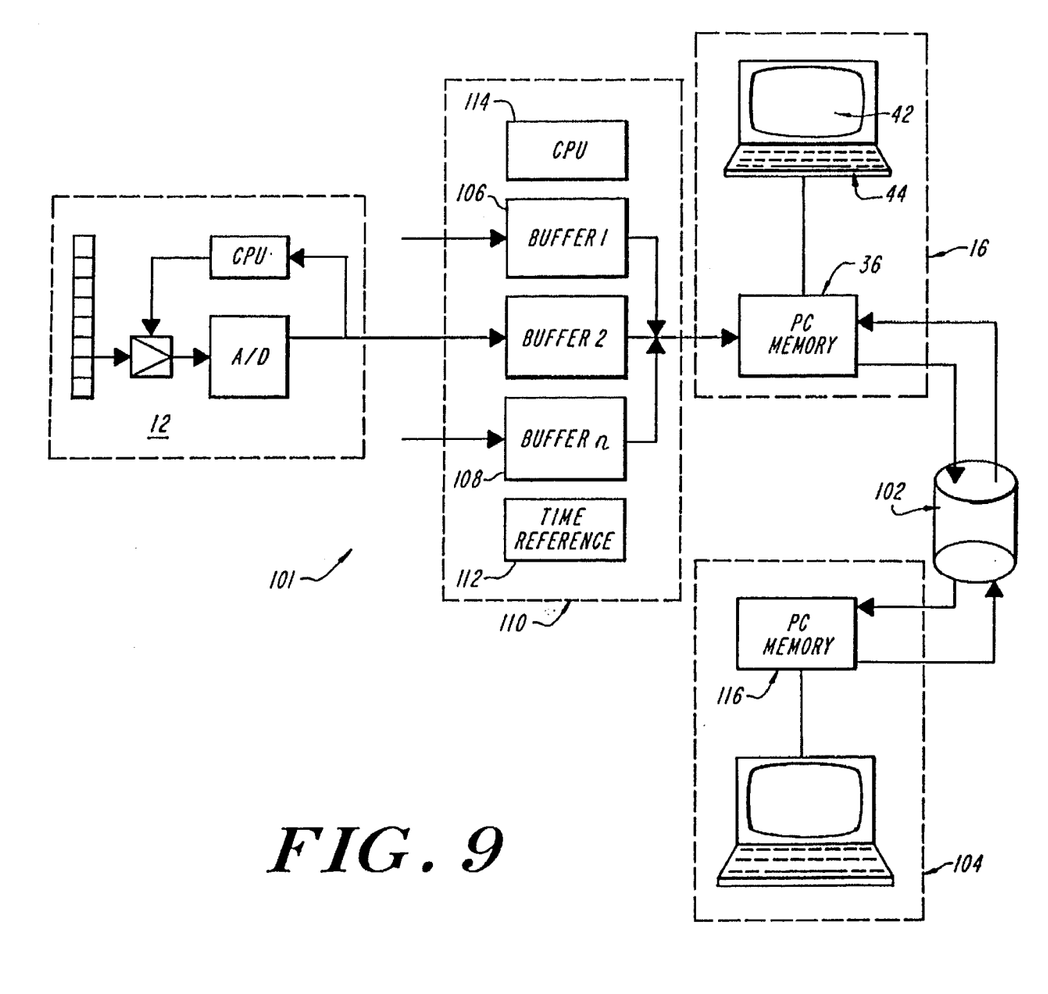
FIG. 9 illustrates a preferred embodiment of the invention utilizing a virtual memory subsystem, multiple cameras, and multiple buffers within an image timer.

With reference to FIG. 9, a system 101 constructed in accordance with the invention also shows an additional computer 104 and additional buffers 106 and 108 within the image timer 110. These additions are not at all required for the operation of the virtual memory subsystem 102, or any other component described above, but rather are useful in further features of the invention.

In particular, the computer 104 allows an additional user to access and analyze portions of previously recorded segments that are stored onto the hard-disc 102. Similar to the main computer 16 of FIG. 1, blocks of information are loaded into the internal memory 116 before processing and displaying the information. All of the features available at the main control computer 16 are also available at the additional computer 104, thereby providing a convenient forum for other management of the data processed during a sequence of motion events, e.g., races already recorded. Of course the main control computer 16 can also operate to review previously recorded segments of any prior motion event—and even during the activities of a current motion event —or operate in a real-time mode and display the current motion event as captured by the camera 12.

A plurality of computers, like the computer 104, are similarly attached to the virtual memory subsystem if other users wish to simultaneously access the data stored on the hard disc. A computer suitable for use within the system described includes common IBM personal computers or compatibles with an 8086 processor, a VGA video adapter, and 640K of RAM.

The buffers 106 and 108 within the image timer 110 of FIG. 9 illustrate another important feature of the invention, namely the addition of a plurality of digital cameras to the system 10 of FIG. 1. In some circumstances, it is desirable to view the motion of bodies crossing the plane in space from two or more vantage points. For example, in a race it is very possible in a close heat that one race participant blocks the view of a singe camera with respect to another race participant. To correct this potential problem, one or more additional digital cameras, like the first one, can generate additional sequences of digital image frames of the line object of interest. Preferably, each additional camera views substantially the same plane in space, e.g., two cameras on either side of a race track exemplifies the use.

Since the buffers for every camera are within the image timer, a single clock 112 provides the time reference for all frames entering the timer. The timer processor 114 can thus mark each frame with a calibrated time reference thereby permitting each camera to operate asynchronously. That is, any of the plurality of cameras can have any selected frame rate or density, and the image timer continues to accurately mark each frame as it enters.

Figure 10:
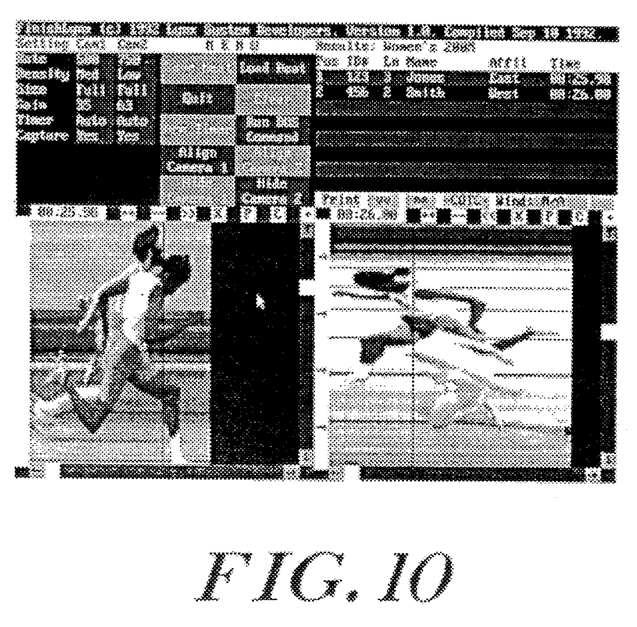
FIG. 10 illustrates a display scene showing two scene sequences generated by two separate cameras.

FIG. 10 illustrates a typical display of a race having two separate cameras on opposing sides of the track. This image is available to any of the computers discussed herein, including the additional computer 104, provided at least two cameras are integrated into a system constructed in accordance with the invention.

In a preferred embodiment, the direction of any displayed sequence of digital image frames forming a scene is reversible by re-ordering the sequence of frames. Thus for example, both of the scenes displayed within FIG. 10 can be reversed if selected in preference by a user of the computer. By operation of a mouse therefore, the separate views of the identical participants within the two scenes can appear to have a motion in the same direction.

The system described herein has other features available to users at any connected computer. Prior to recording an motion event, for example, a selectable part of the displayed scene can be uniquely associated with an object identifier. Thus along the spatial (vertical) domain of the screen, one or more lanes on a race course—and in particular the runner within—can be associated with a particular portion of the screen. A user can, for example, point to that portion and acquire the information relating to that lane, like the entrant's name. Furthermore, because every portion displayed on the screen has a unique time reference associated with it, a user can similarly access and display the time associated with a selected portion on the screen and display its results. In operation, for example, a user can select the lane of the winner in a race to see the person's name; and, more particularly, a user can select the first portion of the winner's body crossing the finish line to display the associated win time. In a preferred embodiment, both the object identifier and the time associated with any portion of the scene on display are automatically entered in a results table if selected by the user.

Any display, showing a scene, race results, or any other information selectable by the user can be printed at any time by an appropriate print command selected at that computer.

The term "greyscale" as used herein shall include not just classic greyscale values but also can include an equivalent color representation (e.g., either a single value or a series of values representing different colors).

Appendix I is an object code listing of a program for carrying out many of the functions described herein. This program is executable on any Intel X86 based personal computer system under MS-DOS.

It is accordingly intended that all matters contained in the above description or shown in the accompanying drawings be interpreted as illustrative rather than in a limiting way.

It is also understood that the following claims are intended to claim all of the specific and generic features of the invention as described herein, and all the statements of the scope of the invention.

What is claimed is:

1. A system for recording and displaying a time sequence of bodies crossing a plane, comprising:

A. a digital camera which generates a sequence of digital image frames, each frame of said sequence representing light values of pixels from a line object that is captured by said camera at a moment in time and imaged onto a linear array of detector elements, said digital camera producing an output signal comprising a plurality of digital words representative of said digital image frames;

B. an image timer, in communication with said digital camera, including a timer processing means which marks each frame of said sequence with a time reference indicative of said moment in time, said image timer further including a buffer adapted to store said digital image frames generated by said digital camera; and C. a main control computer, in communication with said image timer and said digital camera, including an internal memory which stores said frames from said buffer as blocks of information, and a virtual memory subsystem in memory communication with said main control computer, said virtual memory subsystem being adapted for storage of said blocks of information, said main control computer further including a display monitor which displays a portion of said sequence as a time-sequential scene, said main control computer arranged for controlling the operation of said system and responding to commands input by a user wherein said user can selectively command the display of said time-sequential scene of said bodies crossing said plane.

2. The system of claim 1 wherein said array of detector elements is a line scan charge coupled device.

3. The system of claim 1 wherein said digital camera includes a gain control means for controlling the greyscale gain of said digital image frames according to a preselected gain level.

4. The system of claim 3 further comprising a gain selection means for selectively adjusting said preselected gain level for input to said gain control means.

5. The system of claim 3 wherein said preselected gain level corresponds to the digital values of said digital image frames.

6. The system of claim 1 further comprising a frame rate means for selectively adjusting the time-domain resolution of said sequence as captured by said digital camera by selectively adjusting the rate at which each frame of said sequence is generated by said digital camera.

7. The system of claim 1 further comprising a camera density control means for selectively adjusting the spatial-domain resolution of said line object as captured by said digital camera by selectively activating detector elements within said array of detector elements.

8. The system of claim 1 further comprising a timer clock, synchronous with the time of an external event and in communication with said timer processing means, wherein said timer processing means marks each said digital image frame with a time reference indicative of the time from said timer clock.

9. The system of claim 8 further comprising a start sensor for sensing the start time of said external event and synchronizing said timer clock.

10. The system of claim 1 wherein said system includes means to initiate said storage of said blocks of information into said virtual memory subsystem when a predetermined fraction of said internal memory is utilized.

11. The system of claim 10 further comprising a memory management control means wherein said fraction of said internal memory is selectively adjustable.

12. The system of claim 1 wherein said main control computer comprises means for storing said blocks of information from said internal memory into said virtual memory subsystem.

13. The system of claim 12 wherein said main control computer includes means to store said blocks of information in said virtual memory subsystem in a time-sequential manner, whereby said main control computer can access each of said blocks of information by computing an offset from the initial location where the data is stored in virtual memory.

14. The system of claim 1 further comprising a block retrieval means for selectively retrieving a block of information from said virtual memory subsystem and restoring said retrieved block into said internal memory.

15. The system of claim 1 further comprising a first zoom means for selectively adjusting the time-domain resolution of said portion as displayed on said monitor.

16. The system of claim 1 further comprising a second zoom means for selectively adjusting the spatial-domain resolution of said portion as displayed on said monitor.

17. The system of claim 1 further comprising a zoom means for selectively and concurrently adjusting the time-domain and spatial-domain resolution of said portion as displayed on said monitor.

18. The system of claim 1 further comprising a time-crop means for cropping at least one frame of said sequence such that said display of a time-sequential scene will not include said cropped frame.

19. The system of claim 18 wherein said time-crop means includes means to restore said cropped frame such that said display of said time-sequential scene will include said cropped frame.

20. The system of claim 18 wherein said time-crop means includes a listing means for listing each of said cropped frames in a listing memory to maintain an accessible record of said cropping.

21. The system of claim 18 wherein said time-crop means includes erase means to selectively and permanently erase said cropped frame from said listing memory.

22. The system of claim 1 wherein a software pointer points to a location in said internal memory for each of said blocks of information.

23. The system of claim 22 wherein said software pointer corresponds to a zero value when it points to a previously recorded block of information no longer stored within said internal memory.

24. The system of claim 1 wherein said main control computer operates as a cache means for storing selected digital image frames from said virtual memory subsystem, said selected digital image frames excluding those frames marked with time references temporally distant to the time references of said time-sequential scene displayed on said monitor.

25. The system of claim 1 wherein said time reference utilizes a predetermined number of bytes of each of said digital image frames to indicate said moment in time.

26. The system of claim 1 further comprising image inversion means for selectively inverting the time sequence of said portion whereby said time-sequential scene is displayed on said monitor in a reverse time order.

27. The system of claim 1 further comprising an object identification means for providing at least one object identifier corresponding to a predetermined part of said portion, whereby said object identifier is selectively available to said user at said main control computer display.

28. The system of claim 1 further comprising a time identification means for providing at least one said time reference corresponding to a selected part of said portion, whereby said time reference is available to said user at said main control computer display.

29. The system of claim 27 wherein said object identifier is automatically entered as displayed information on said monitor once selected.

30. The system of claim 28 wherein said time reference is automatically entered as displayed information on said monitor once selected.

31. The system of claim 1 wherein said system includes means to show a real-time view of said objects crossing said plane.

32. The system of claim 1 further comprising compression means for compressing said blocks of information to utilize less memory in the storage of said blocks of information.

33. A system for recording and displaying a time sequence of bodies crossing a plane, comprising:
  A. a first digital camera which generates a first sequence of digital image frames, each frame of said first sequence representing a first line object that is captured by said first digital camera at a first moment in time and imaged onto a first linear array of detector elements;
  B. a second digital camera means which generates a second sequence of digital image frames, each frame of said second sequence representing a second line object that is captured by said second digital camera means at a second moment in time and imaged onto a second linear array of detector elements;

C. an image timer in communication with said first digital camera and with said second digital camera means, including a timer processing means which marks each frame of said first and second sequence of digital image frames with a time reference indicative of said first and second moments in time, said image timer further including a first buffer adapted to store said first sequence of digital data frames generated from said first digital camera, said image timer further including a second buffer adapted to store said second sequence of digital data frames generated from said second digital camera means; and D. a main control computer in communication with said image timer, including an internal memory which stores the frames from said first and second buffers into blocks of information, and a virtual memory subsystem in memory communication with said main control computer, said virtual memory subsystem being adapted for storage of said blocks of information, said main control computer further including a display monitor, which displays a portion of said first and second sequence as a time-sequential scene, said main control computer arranged for controlling the operation of said system and responding to commands input by a user wherein said user can selectively command the display of said time-sequential scene of said bodies crossing said plane as captured by said first digital camera and said second digital camera means.

34. The system of claim 33 wherein said second digital camera is arranged for viewing substantially the same said first line object as said first digital camera.

35. The system of claim 33 wherein (i) said second digital camera means comprises a plurality of second cameras for generating a plurality of second sequences, (ii) said second buffer contains a plurality of second buffers adapted to store said plurality of second sequences, and (iii) said main control computer is adapted to display a portion of any sequence generated by each of said cameras as a time sequential scene.

36. The system of claim 35 wherein each of said plurality of second cameras can operate at a selectable data rate independently from any other camera data rate.

37. The system of claim 35 wherein said main control computer comprises a plurality of computers, each adapted to concurrently display any of said portions as generated by said plurality of cameras.

38. The system of claim 1 wherein said timer processing means responds to a preselected value in the digital values of said digital image frame and thereafter marks said time reference.

39. The system of claim 1 wherein said digital camera responds to a preselected signal from said timer to generate a digital image frame.

40. The system of claim 1 wherein said main control computer comprises a plurality of computers, each connected to said virtual memory subsystem and each adapted to selectively display a portion of any sequence of digital data frames stored in said virtual memory subsystem.

41. The system of claim 1 further comprising a coaxial cable for communicating digital data from said camera to said image timer, said cable further comprising means for concurrently communicating control signals from said main control computer and said image timer, and for providing power for said camera.

42. The system of claim 41 wherein said camera includes a camera processor, said processor being selectively adjustable to compress data transmitted from said camera to said image timer, thereby reducing the bandwidth requirements of said cable.

43. The system of claim 1 wherein said timer process is adapted to selectively compress data transmitted from said image timer to said main control computer.

* * * * *